Figure 1:
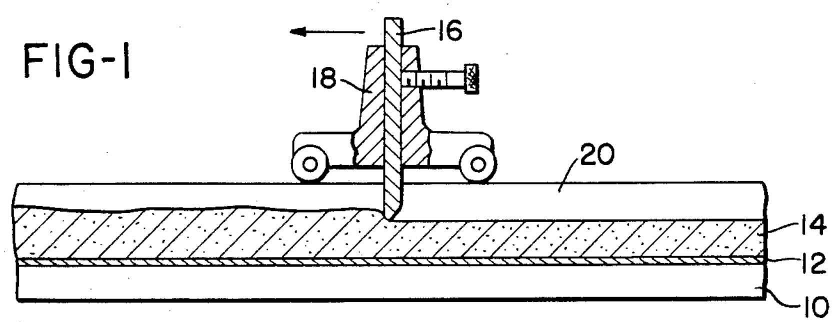

United States Patent [19]

Grab et al.

[11] Patent Number: 4,491,559

[45] Date of Patent: Jan. 1, 1985

[54] FLOWABLE COMPOSITION ADAPTED FOR SINTERING AND METHOD OF MAKING

[75] Inventors: George P. Grab, Greensburg; Grant W. Hood, Jr., Stahlstown, both of Pa.; Sigurd A. Swanson, Shakopee, Minn.; Bela J. Nemeth, Greensburg, Pa.

[73] Assignee: Kennametal Inc., Latrobe, Pa.

[21] Appl. No.: 370,934

[22] Filed: Apr. 22, 1982

Related U.S. Application Data

[60] Continuation of Ser. No. 108,968, Dec. 31, 1979, , which is a division of Ser. No. 854,775, Nov. 25, 1979, abandoned, which is a continuation of Ser. No. 409,728, Oct. 25, 1973, abandoned.

[51] Int. Cl.[3] .......... B22F 3/00

[52] U.S. Cl. .......... 419/36; 419/39; 419/40

[58] Field of Search .......... 419/36, 37, 39, 40

[56] References Cited

U.S. PATENT DOCUMENTS

| | | | |
|---|---|---|---|
| 3,335,002 | 8/1967 | Clarke | 75/211 |
| 3,489,555 | 1/1970 | Thellman | 75/211 |
| 3,502,466 | 3/1970 | Vickery | 75/211 |
| 3,653,882 | 4/1972 | Petrasek et al. | 75/211 |
| 3,672,882 | 6/1972 | Sagmuller et al. | 75/211 |
| 3,888,662 | 6/1975 | Boeckeler | 75/211 |
| 4,062,678 | 12/1977 | Dreyer et al. | 75/211 |

*Primary Examiner*—Ben R. Padgett
*Assistant Examiner*—Anne Brookes
*Attorney, Agent, or Firm*—Lawrence R. Burns

[57] ABSTRACT

A flowable material, or slurry, comprising a liquid vehicle and solid particulate material dispersed therein which will flow out flat in the form of a sheet. The material, upon exposure to the atmosphere, and either with or without the application of heat, will set up in a dimensionally stable form and can, thereafter, be sintered to form a solid article. The fraction of the vehicle of the composition which remains after the solvent evaporates, vaporizes during sintering and the final product consists only of the particulate material in sintered form.

25 Claims, 7 Drawing Figures

16

18

20

14

12

10

16
18
20
14
12
10

26
22
24

30
28
32

38
40

36
34

42
45
44
48
46

58
56
54
52
50

60
56
54
60

FLOWABLE COMPOSITION ADAPTED FOR SINTERING AND METHOD OF MAKING

This is a continuation of application Ser. No. 108,968, filed Dec. 31, 1979, which is a divisional application of prior application Ser. No. 854,775, filed Nov. 25, 1979, now abandoned, which is a streamline continuation of prior application Ser. No. 409,728, filed Oct. 25, 1973, now abandoned.

The present invention relates to a flowable composition, and a method of making the same, in which solid particulate material is dispersed in a liquid vehicle and which can be subjected to heat to drive off the liquid vehicle to form a solid sintered article.

Articles formed of sintered particulate material are well known and include products formed from powdered metals, from ceramics, and from materials such as metal carbides. Usually, the materials to be employed in making the article are reduced to fine particulate form and then admixed intimately in the proper proportions, compacted to a desired shape, and then sintered by heating, and using a controlled atmosphere when necessary.

The particulate material is ordinarily admixed with a temporary binding agent, such as paraffin wax or the like, prior to compacting so that when the article is compacted, as by a press in a die cavity or the like, the compacted article will be dimensionally stable and will permit handling, with care, to process it through the sintering step.

With powdered metals, it is many times the case that the article being made consists of a single material only, which may be a metal alloy which has been reduced to particulate form. With sintered articles made of metal carbides, it is usually the case that the material to be sintered consists of the metal carbide in finely divided form together with a cementing metal also in finely divided form.

Methods for processing materials of the aforesaid nature include hot pressing techniques in which the material is heated to sintering temperature simultaneously with pressing. Cold pressing techniques are also common in which the material is first compacted, and then raised to sintering temperature in a separate operation. Due to the substantial convenience and greater simplicity of the type of processing that includes cold pressing, most cemented carbide articles are formed by the cold pressing method.

The present invention pertains in particular to the making of articles in the form of cemented carbide articles and specific examples are given of this type of product, but it will be understood that any sinterable particulate material is adapted for being processed in conformity with the present invention.

A primary object of the present invention is the provision of a novel method of making sintered articles from particulate material in which a pressing operation is not necessary.

Still another object of the present invention is the provision of a composition, and a method of making the composition, in which the composition can be employed for making sintered solid articles and in which the composition can be stored for long periods of time.

A further object of the present invention is the provision of a composition for making sintered articles from particulate material without pressing in which the resulting article is characterized in being uniform throughout.

BRIEF SUMMARY OF THE INVENTION

The present invention proposes to take finely divided particulate material, such as ceramic material, metal powders, mixtures thereof, or mixtures of metal carbide powders and other metal powders, and entrain the particulate material in a liquid vehicle to provide a flowable slurry composition. The flowable composition can be formed into sheets, or it can be shaped in a mold cavity.

The liquid fraction of the composition is characterized in that it includes a solvent which will vaporize at a relatively low temperature, even as low as room temperature, and the remaining part of the liquid fraction is so compounded that upon the solvent passing therefrom, it binds the particles together and the composition becomes dimensionally stable.

Once the article becomes dimensionally stable, it can be treated by conventional sintering methods during which the remaining part of the liquid fraction vaporizes leaving only the particulate composition which will sinter into solid form in the manner well known in respect of sintered products.

The composition according to the present invention employs a liquid fraction which is non-reactive with the solid particulate material entrained therein and which is substantially completely fugitive so that substantially no residue remains behind when the liquid fraction is gassified and the resulting sintered product will be free of contamination.

The particulate material entrained in the liquid fraction is quite often made up of materials which differ greatly in specific gravity and which would, normally, tend to settle or stratify in the liquid vehicle. This is especially the case when sintered carbide compositions are to be made because a metal carbide, such as tungsten carbide, is much heavier than the binder metal employed therewith, usually iron, cobalt, or nickel or mixtures thereof, and has a different specific gravity from other materials such as titanium carbide, tantalum carbide, molybdenum and the like, which might also be mixed with the tungsten carbide.

The composition according to the present invention, thus, includes a surface active agent which is admixed therewith and which coats the individual particles of the particulate material and imparts a charge thereto so that the individual particles will repel each other and will substantially remain in a uniformly distributed relationship in the liquid vehicle in a specific temperature range. The particles will not tend to settle out or stratify in the vehicle which would make the final product nonuniform in composition, especially in the vertical direction with respect to the disposition of the article when first formed from the flowable composition.

The particulate material, within a temperature range and prepared as disclosed herein, will remain in uniform suspension in the liquid vehicle for prolonged periods of time. Thus, the particulate material can be admixed with the liquid vehicle and stored in closed containers until it is used for forming articles.

A feature of the present invention resides in the fact that particulate material of a degree of fineness that it has not heretofore been practical to employ in the manufacture of sintered articles can be readily processed according to the present invention. Extremely fine powders present such a large surface-to-volume ratios that many thereof are pyrophoric and can be handled only with special precautions.

Such powders, when processed by conventional methods, such as by milling together with other powders and then cold pressing prior to sintering, must be blanketed by an inert gas for safety reasons. In other instances a vacuum or other inert environment must be used.

According to the present invention, once such fine powders are entrained in the liquid vehicle, precautions such as that of providing an inert gas blanket are not needed. The advantages of sintering workpieces from extremely finely divided powders can, thus, be realized by the practice of the present invention in a relatively simple manner.

The accompanying drawing schematically illustrates certain procedural steps that can be carried out in making articles according to the present invention. In the drawings;

FIG. 1 schematically illustrates the manner in which the material can be flowed out on a release sheet and leveled to a predetermined thickness.

Figure 2:
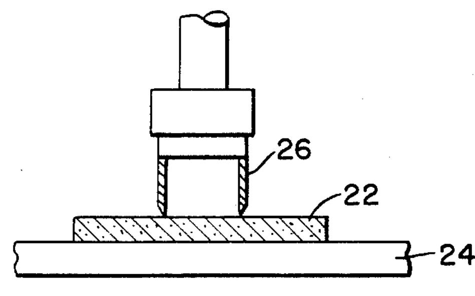

FIG. 2 schematically illustrates die cutting of the material after it has been flowed out and set up.

Figure 3:
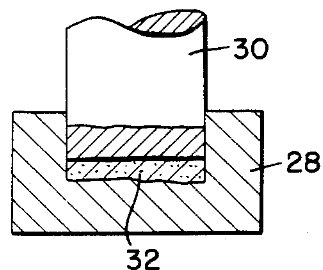

FIG. 3 shows how a piece of the material after having been cut out can be coined.

Figure 4:
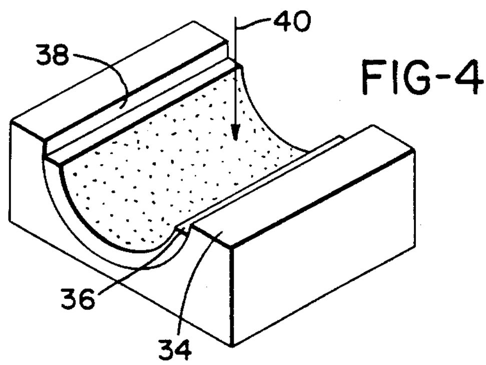

FIG. 4 schematically shows how a curved piece can be made by effecting the curving of the piece either prior to or during sintering.

Figure 5:
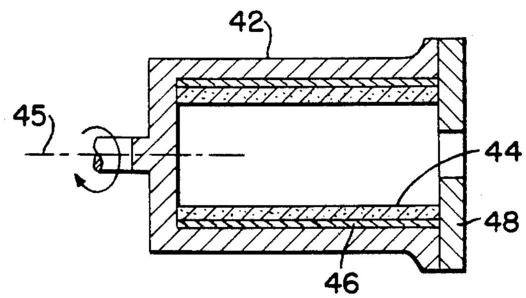

FIG. 5 schematically illustrates the spin casting of a cylindrical member by pouring slurry into a rotating cylindrical mold.

Figure 6:
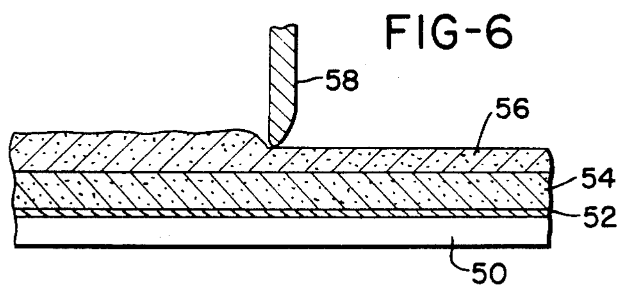

FIG. 6 schematically shows how a laminated article can be made.

Figure 7:
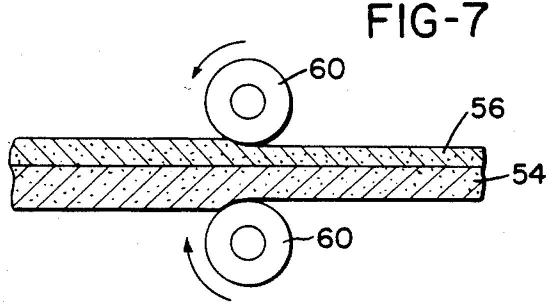

FIG. 7 schematically illustrates rolling of a laminated article prior to sintering.

By way of explanation, certain specific examples showing the manner in which the present invention is practiced are given below.

A slurry composition for tungsten carbide with 6 wt. % cobalt may be made up according to the following schedule:

Particulate Composition: 81.0 weight percent
Surface Active Agent: 0.2 weight percent
Solvent: 17.1 weight percent
Fugitive Binder: 1.7 weight percent The metal carbide-binder mix is a mix that can be used for cold pressing and may consist of metal carbide powder which has been intimately admixed with from about 1 up to about 25 weight percent binder metal. The binder metal may comprise cobalt, nickel, iron or mixtures thereof.

The metal carbide may consist principally of tungsten carbide, although the tungsten carbide may be admixed with titanium carbide, tantalum carbide, niobium carbide or other carbides or the tungsten carbide may be present in the form of solid solution with, for example, titanium carbide. The principal component of the metal carbide in the mixture may be a carbide other than tungsten carbide, for example, titanium carbide.

A metal, such as tungsten, can be added to the above composition to serve as a carbon getter because certain of the materials may not vaporize completely when the mixture is heated and will leave a slight residue of carbon. This residue will react with the tungsten metal during sintering. It is also possible for the mixture to contain carbon deficient tungsten carbide in which case the carbon will react with the carbon deficient tungsten carbide during sintering.

The surface active agent referred to can be any of several known surface active agents such as the tertiary amines or quaternary ammonium salts. The surface active agent will cost the particles of material and impart a charge to each thereof such that the particles tend to form a uniform suspension and help achieve improved density for the composition once the solvent has been removed.

The solvent acts to maintain the mixture in flowable fluid condition so that it can be shaped, spread out and otherwise handled in the making of articles from the composition. Typical solvents include methyl ethyl ketone, chlorinated hydrocarbons or other common solvents which are nonreactive with the particulate material employed.

The fugitive binder can be a copolymer of ethylene and vinyl acetate or polyacrylic rubber or other resin which is soluble in the solvent employed. As the solvent is evaporated from the slurry the fugitive binder holds the particulate material in a dimensionally stable condition. The composite is non-brittle and can be fabricated readily.

The metal powder, solvent, resin and surface active agent in the example referred to above are placed in a mill with about a 20 volume percent charge of grinding media and milled for up to about 18 hours at a temperature above 90 degrees Fahrenheit. This milling of all of the ingredients of the compound forms a rather thick, but easily pourable slurry in which the metal particles are uniformly distributed and which are held in distributed suspended relation by the surface active agent and fugitive binder which have coated each particle during the milling process.

The slurry, at the end of the milling operation, is discharged into a container and is preferably rotated or mildly agitated to permit any air entrapped therein to escape. Alternatively, the milling media can be removed from the mill and the mill operated slowly to release the entrapped air. The slurry is now ready to use, or it can be stored in sealed containers for a prolonged period of time.

Due to the surface active agent and fugitive binder which coat the individual particles, there is little tendency for the particles to settle out in the slurry and, at most, a slight stirring action, above 90° F. for the above example, is all that is necessary to prepare a stored slurry for use in forming articles therefrom. The slurry composition referred to can, itself, form an article of commerce and be sold for use in the making of articles according to the present invention.

In making articles from the slurry, the slurry may, for example, be poured out on a smooth surface. A silicone coated paper sheet, for example, is suitable for receiving the slurry and will free itself or can be easily peeled from the article after the solvent has evaporated. Since the slurry is rather viscous, it is preferable to spread the slurry out on the release sheet as by the use of a doctor blade or a knife so that a uniform layer of the material is formed on the release sheet.

The solvent is then evaporated from the slurry either with or without the application of a small amount of heat. The pouring of the slurry takes place at elevated temperature where the slurry is relatively freely flowable. However, some small amount of cooling may be supplied if desired, or necessary.

runs of articles of this nature, thus become quite practical when practicing the present invention.

It is sometimes the case that a surface contoured in three dimensions is to be provided with a hard wear resistant surface layer. The most satisfactory sort of surface layer is an extremely hard cemented material such as cemented hard metal carbides or ceramics. Heretofore, the manufacture of hard materials to provide layers for such surfaces was extremely difficult and many times a compromise was arrived at by making small pieces of the hard material and cementing or brasing the small pieces in side by side relation on the surface.

According to the present invention, however, such surfacing members can readily be made, even of extremely hard cemented carbide material, by flowing out sheet material and then sintering the material while confining the sheet, or supporting the sheet on a form contoured the same as the member on which the sintered article is to be mounted.

In this manner, curved and other irregularly configured surfaces can be provided with a hard wear resistant layer more simply than was heretofore possible and in an improved manner because the hard surfacing article conforms more nearly to the surface to be protected and can be without seams or joints.

Other possibilities present themselves in respect of the composition of the present invention. Inasmuch as the composition can be flowed out in thin sheets and permitted to solidify at least to a dimensionally stable plastic condition prior to sintering, the possibility presents itself of laminating the sheets with each other and then sintering the laminated sheets which may be subjected to pressure, as by rolling, before sintering. Such articles, when sintered, could be stratified according to the compositions of the various layers, or thick members could be built up by laminating sheets formed from like compositions.

It is also possible to employ the composition in the flowable state for making workpieces which present extreme difficulties when constructed in any other manner, for example, cylindrical workpieces such as might be employed for cylinder liners or the like.

A cylindrical, or tubular, workpiece can readily be made by the use of the composition according to the present invention by a simple spin casting or centrifugal casting technique in which the flowable composition is poured into a rotating mold and within which the composition will distribute itself in the form of a uniform layer due to centrifugal action.

By rotating the mold until the composition sets up, a cylindrical article is produced which after drying can be sintered to form the final product.

The accompanying drawings schematically illustrate the manner in which the composition according to the present invention can be formed into work pieces. In FIG. 1, 10 represents a planar support member and 12 is a release sheet resting thereon which may be, for example, silicon coated paper. 14 indicates a layer of the slurry material which has been poured out on release sheet 12. The poured out layer of slurry material is worked to a uniform thickness with a smooth surface as by a doctor blade 16 adjustably mounted in a carriage 18 that is guided for straight line movement along track means 20.

After the material has been flowed out on the release sheet and sufficient solvent evaporates therefrom, the layer of material becomes self-supporting and dimensionally stable and can be handled. It can, at this time, readily be stripped from the release sheet 12 and can then be cut, shaped and otherwise physically modified prior to sintering.

For example, in FIG. 2, a piece of the material at 22 rests on a support 24 and can be cut by a sharp bladed die 26 to form a work piece of a desired configuration which can then be sintered to form the final article. The size of the die 26 is selected so as to take into account the shrinkage that occurs during sintering so that the final sintered work piece will be of the proper size and shape.

The material, prior to sintering, is somewhat plastic and a piece of the material can be pressed to impart a certain surface configuration thereto, as shown in FIG. 3. In FIG. 3, 28 is a member having a die cavity therein and 30 is a punch adapted to enter the die cavity and to press a member 32 which is a piece of the set up composition of the present invention prior to sintering.

In this manner, any desired surface configuration, within limits, can be imparted to either one or both sides of the member 32 prior to sintering of the member.

It has been mentioned that the material can be bent before or during sintering, and FIG. 4 shows one way in which this could be done. In FIG. 4, 34 is a block of, for example, graphite, and 36 is a strip of the composition according to the present invention which has been placed on support 34 prior to sintering. During sintering, the member 36 will conform to the configuration of the recess 38 formed in support 34 and, if desired, the member 36 can be weighted so that a force is applied thereto as indicated by arrow 40.

FIG. 5 shows a cylindrical mold 42 adapted for rotation on a central axis 44. Slurry material poured into the cylinder while it is rotating will be thrown radially outwardly therein and form a cylindrical work member 44. The cylindrical cavity may be aligned with release paper as at 46 or the cavity may simply be polished and have a release agent spread thereon. In making such a casting, the mold is rotated at the proper velocity while the slurry is being poured therein and is maintained in rotation until the material commences to gel.

When the material has gelled to a self-supporting consistency by the evaporation of solvent therefrom, the rotation of the mold is halted because some shrinkage of the work piece will take place as the solvent evaporates therefrom, and if the mold were continued in rotation as the work piece grew smaller in dimensions, the work piece could crack. The work piece can easily be removed from the cavity by removing cover 48 and can then be sintered to form a rigid cylindrical work member uniform in composition throughout.

It has been mentioned that the compositions according to the present invention are adapted for being laminated and this is schematically illustrated in FIG. 6 wherein 50 is a support member with a release sheet 52 thereon. A first layer 54 of the composition according to the present invention has been applied to sheet 52 and leveled out and this layer is permitted at least to gel before a second layer 56 is superposed on layer 54 and leveled out thereon as by moving knife 58.

The layers 54 and 56 will adhere to each other when the solvent has evaporated therefrom and can be sintered with no further work operations being performed thereon, other than cutting the material to the desired shape as by a die cutter. However, the layers 54 and 56 can also be subjected to a rolling or pressing operation as shown in FIG. 7 in which the layers are passed be- When the solvent has evaporated from the slurry, the article, which now consists principally of particulate material held together by the fugitive binders, becomes dimensionally stable and can be readily handled. The sheet can be cut and otherwise formed to the desired configuration without damage to the article. The material is much more easy to handle than dry compacted powders because it is less fragile and is also somewhat flexible because of the nature of the binder.

The article which has been cut or formed from the solid sheet can now be sintered according to conventional practices. Depending on the nature of the particulate material in the composition, the article can be sintered in a hydrogen atmosphere or in vacuum or in an inert gas atmosphere, as would be the practice commonly employed.

In compositions in which the particulate material is not subject to oxidation, such as ceramic material, the sintering can be carried out in air. The sintering of ceramic materials in air can be of merit because during the sintering the binder is driven off and any carbon residue in the article being sintered will react with oxygen.

The articles to be sintered can be pressed, or rolled, prior to sintering and the amount of shrinkage the article will undergo when sintered will be decreased somewhat. The end product, however, does not differ in any material sense from an article which has not been pressed or rolled.

The time required to form articles according to the present invention can be shorter than the time required for cold pressing and sintering while the end product obtained is substantially the same with respect to density and other qualities.

In the following example, a high specific gravity tungsten alloy was prepared by blending and milling tungsten with small amounts of nickel, copper and iron to a fine powder and admixing with a polyacrylic rubber in the amount of about 0.5 weight percent of the powder blend, adding a copolymer of ethylene and vinyl acetate in the amount of about 0.5 weight percent of the powder blend, a surface active agent in the amount of about 0.25 weight percent of the powder blend, and a chlorinated hydrocarbon solvent in the amount of 125 milliliters per kilogram of the metal powder blend.

This mixture was milled at 125 degrees Fahrenheit for 16 hours in a rod mill. At the end of the mill period, the rods were removed from the mill and the mill was rotated slowly for another four hours to release entrapped air from the mixture.

The slurry was then employed for forming sheets up to about one-fourth inch thick by pouring the slurry on silicone coated release paper and smoothing the deposit with a knife blade.

After a twenty-four hour drying period, without the addition of heat, the sheet was peeled from the release paper and could readily be handled.

Such a dried sheet may be cut to desired shapes with a sharp edged cutting tool, with sharp cutting dies, or with a punch and die assembly.

Scrap material remaining after the cutting operation, either in the present example or in the one given above, can be reused by adding solvent to the scrap and forming a slurry thereof.

The articles formed according to the example just given may be sintered in the same manner as cold pressed compacts. It has been found that the linear shrinkage of the last given example in the plane of the sheet amounts to about 33 percent and about 20 percent in a direction perpendicular to the plane.

The composition according to the present invention, when flowed out and the solvent evaporated therefrom, is self-supporting and can readily be handled but is, nevertheless, somewhat plastic and can be pressed or rolled or otherwise treated. Pressing and rolling of the material will change the shrinkage characteristics thereof somewhat but have not been found to change the final sintered characteristics of the article. It can also be shaped using conventional tooling such as drills, grinding wheels, milling cutters, cold forming operations and the like.

A particular advantage in respect of the practice of the present invention is that a large clase of workpieces can be manufactured with ease that heretofore presented considerable problems in respect of both manufacture and economy. A characteristic of powdered materials, especially powdered materials embodying hard metallic carbides, is that it is difficult to cause dry powdered material to flow readily under pressure, especially in a direction at right angles to the direction of applied pressure.

Furthermore, the successful compacting of dry powders requires considerable force. For example, 2,000 pounds per square inch is not an unusual pressure to be employed in compacting dry granular material, even when the dry material has a lubricant entrained therein. For the reason that high pressures are required adequately to compact dry material and the flowability of the material is limited, it will be evident that a workpiece presenting any substantial area will present considerable problems.

Also, members of substantial area which are quite thin are extremely difficult to make by dry compaction not only because of the pressure required but also because the material does not tend to distribute uniformly over the area to be pressed. By the practice of the present invention, the foregoing problems are eliminated and such workpieces can be made quite economically. For example, a flat member, say 5 inches on each side and relatively thin would present 25 square inches to be subjected to pressure if dry pressed and would most likely be nonuniform with regard to density.

Such work members can readily be formed according to the present invention by flowing the composition described out on a release sheet and smoothing the material out to the desired thickness and then, after the solvent had been evaporated therefrom, trimming the solidified sheet to the present dimensions and then sintering. With extremely thin workpieces, it might be desirable to confine the workpiece during sintering to prevent warping thereof, but this presents no unusual problems during the sintering operation.

Still further, small links and levers or the like or irregular shapes offer the same problems in connection with dry compacting while also requiring the provision of a die cavity of the proper configuration in which the materials are pressed. The expense of a die cavity, together with the problems referred to above, makes the manufacture of such items from powdered materials such as cemented carbides impractical except where the volume is extremely high.

According to the present invention, a sheet of the desired thickness can be formed and articles of the proper shape then cut therefrom either by use of simple cutting dies or by use of a laser beam or the like. Short tween pressure rollers 60. Pressure roller 60 will reduce the laminated work member to the desired dimensions and will, likewise, firmly press it to layers thereof together.

The layers 54 and 56 may be identical compositions or may be different compositions depending on what is needed. For example, the same composition can be employed for the layers when it is desired to make an extremely thick work piece. For a thick work piece, there could be two or more laiminations built up so that any desired thickness could be achieved.

In other cases, it may be desired for the sintered member to have a surface layer of one characteristic and a base layer having another characteristic. In this case, the layers 54 and 56 would have respectively different compositions and one thereof could be thicker than the other, as shown in FIGS. 6 and 7. The possibilities in respect of laminating the compositions to obtain desired results will be evident and it will be understood that the showing of only two laminations of different thicknesses is merely exemplary of the many possibilities.

Modifications may be made within the scope of the appended claims.

What is claimed is:

1. The method of making rigid sintered articles from a sinterable powdered material comprising at least one of the class of metals, metal alloys, metal carbides, refractory compounds, and ceramics which comprises: forming a flowable composition by intimately admixing the powdered material with a liquid vehicle which comprises a soluble fugitive binder and a solvent therefor and a surfactant, flowing the composition out to one of a desired shape and/or thickness, avoiding the step of mechanically compacting the article, evaporating the solvent from the composition at a first temperature to form a self-supporting flexible body, and heating the body to a second temperature higher than said first temperature to volatilize the fugitive binder therefrom and sintering the powdered material at a third temperature higher than said second temperature to form a rigid solid article.

2. The method according to claim 1 in which the composition is flowed out to a desired thickness and is cut to a desired contour after evaporating of the solvent therefrom and prior to sintering.

3. The method according to claim 1 which includes compacting the body in at least one direction prior to sintering thereof.

4. The method according to claim 1 in which said powdered material comprises one or more carbides, 0 to 15 weight percent tungsten and binder metal.

5. The method according to claim 1 in which said powdered material comprises carbon deficient metal carbide and a binder metal.

6. The method according to claim 1 which includes physically the article after solvent evaporation and before completion of the sintering thereof.

7. The method according to claim 1 which includes in said composition a substance which will react with carbon at the sintering temperature of said composition.

8. The method according to claim 7 which includes selecting said powdered material from one metal in both carburized and uncarbonized form together with a binder metal therefor and a carbon deficient metal carbide together with a binder metal therefor; the uncarburized metal is the one and the carbon deficient metal carbide in the other wise serving as a carbon getter during sintering.

9. A rigid sintered article made according to the method of claim 1.

10. An article according to claim 9 in which said powdered material comprises metal carbide and a binder metal therefor.

11. The method according to claim 1 which includes depositing at least two layers of the flowable composition in superposed relation prior to sintering.

12. The method according to claim 11 wherein said layers comprise respective and different compositions.

13. A rigid article having at least two superposed layers, each layer comprising a sintered composition, said article being made according to the method of claim 12.

14. A rigid article having at least two superposed layers, each layer comprising a sintered composition, said article being made according to the method of claim 11.

15. An article according to claim 14 in which the powdered material in at least one of said layers comprises metal carbide and a binder metal therefor.

16. An article according to claim 14 in which the powdered material in each of said layers comprises metal carbide and a binder metal therefor.

17. The method according to claim 11 wherein said solvent is selected from the group consisting of methyl ethyl ketone and chlorinated hydrocarbons.

18. The method according to claims 1 or 17 wherein said surfactant is selected from the group consisting of tertiary amines and quaternary ammonium salts.

19. The method according to claims 1 or 17 wherein said powdered material comprises a metal and a metal carbide having significantly different theoretical densities.

20. The method of claim 1 wherein the flowable composition further comprises paraffin wax in an amount significantly less than the amount of surfactant.

21. The method of claim 20 wherein the paraffin wax is in an amount of about 0.1 weight percent.

22. The method according to claims 1 or 7 wherein said fugitive binder is selected from the group of plastics consisting of copolymers of ethylene and vinyl acetate, polyacrylic rubber and other resins; and wherein said plastic is soluble in said solvent.

23. The method according to claim 22 wherein said surfactant is selected from the group consisting of tertiary amines and quaternary ammonium salts.

24. The method according to claim 23 wherein said powdered material comprises a metal and a metal carbide having significantly different theoretical densities.

25. The method according to claim 24 wherein said metal carbide is tungsten carbide and said metal is cobalt.

* * * * *